US012106918B2

(12) United States Patent
Takahashi et al.

(10) Patent No.: US 12,106,918 B2
(45) Date of Patent: Oct. 1, 2024

(54) ELECTROMAGNETIC RELAY

(71) Applicant: OMRON Corporation, Kyoto (JP)

(72) Inventors: Kei Takahashi, Kyoto (JP); Yuichiro Teshima, Kyoto (JP); Tomohiro Yamakita, Kyoto (JP); Koichiro Matsushima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 24 days.

(21) Appl. No.: 17/952,329

(22) Filed: Sep. 26, 2022

(65) Prior Publication Data

US 2023/0119728 A1 Apr. 20, 2023

(30) Foreign Application Priority Data

Oct. 19, 2021 (JP) ................................ 2021-170861

(51) Int. Cl.
*H01H 50/62* (2006.01)
*H01H 50/14* (2006.01)

(52) U.S. Cl.
CPC ............ *H01H 50/62* (2013.01); *H01H 50/14* (2013.01)

(58) Field of Classification Search
CPC ........ H01H 50/12; H01H 50/02; H01H 50/14; H01H 50/18; H01H 50/54; H01H 50/60; H01H 45/12; H01H 50/58; H01H 50/546; H01H 50/62
USPC ........................................................ 332/108
See application file for complete search history.

(56) References Cited

U.S. PATENT DOCUMENTS

| | | | | | |
|---|---|---|---|---|---|
| 3,204,057 | A * | 8/1965 | Magida | H01H 51/287 | 335/133 |
| 3,878,489 | A * | 4/1975 | Rothweiler | H01H 50/14 | 335/2 |
| 4,158,828 | A * | 6/1979 | Kindelspire | H01H 50/048 | 439/752 |
| 4,175,260 | A * | 11/1979 | Woods | H01H 50/048 | 439/737 |
| 4,218,626 | A * | 8/1980 | Fukuda | H10N 52/00 | 257/E43.002 |
| 4,429,292 | A * | 1/1984 | Schedele | H01H 50/36 | 335/135 |
| 4,479,117 | A * | 10/1984 | Marquardt | H01H 50/08 | 340/653 |
| 4,599,588 | A * | 7/1986 | Bell | H01H 1/5822 | 439/942 |
| 4,987,396 | A * | 1/1991 | Bogner | H01H 1/2083 | 335/131 |

(Continued)

FOREIGN PATENT DOCUMENTS

JP 2021-57225 A 4/2021

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a housing, a movable contact piece, a first fixed terminal, and a drive device. The movable contact piece is disposed in the housing. The first fixed terminal includes a first contact portion and a first terminal portion. The first contact portion faces the movable contact piece in the housing. The first terminal portion protrudes out of the housing. The first terminal portion has a bent shape. The drive device moves the movable contact piece in a contact direction and an opening direction.

11 Claims, 10 Drawing Sheets

(56) References Cited

U.S. PATENT DOCUMENTS

| | | | | |
|---|---|---|---|---|
| 5,027,094 | A * | 6/1991 | Yasuoka | H01H 50/14 335/83 |
| 5,352,999 | A * | 10/1994 | Hoffmann | H01H 50/14 335/86 |
| 5,572,176 | A * | 11/1996 | Heinzl | H01H 50/642 335/131 |
| 5,982,257 | A * | 11/1999 | Vernier | H01H 50/54 335/274 |
| 6,377,143 | B1 * | 4/2002 | Zhou | H01H 50/546 218/154 |
| 9,401,256 | B2 * | 7/2016 | Fujimoto | H01H 50/36 |
| 9,640,354 | B2 * | 5/2017 | Nishimura | H01H 50/60 |
| 9,859,078 | B2 * | 1/2018 | Kubono | H01H 1/06 |
| 9,865,420 | B2 * | 1/2018 | Kubono | H01H 50/28 |
| 10,090,127 | B2 * | 10/2018 | Ito | H01H 50/56 |
| 10,242,829 | B2 * | 3/2019 | Hasegawa | H01H 50/14 |
| 10,714,289 | B2 * | 7/2020 | Minowa | H01H 1/502 |
| 10,720,294 | B2 * | 7/2020 | Minowa | H01H 50/54 |
| 11,133,140 | B2 * | 9/2021 | Inoue | H01H 50/36 |
| 2005/0046527 | A1 * | 3/2005 | Chida | H01H 50/60 335/78 |
| 2008/0030288 | A1 * | 2/2008 | Mader | H01H 50/043 335/2 |
| 2012/0313737 | A1 * | 12/2012 | Iwamoto | H01H 51/06 335/185 |
| 2013/0069744 | A1 * | 3/2013 | Shinkai | H01H 11/00 335/2 |
| 2014/0015628 | A1 * | 1/2014 | Shinkai | H01H 50/305 335/189 |
| 2014/0028418 | A1 * | 1/2014 | Yamashita | H01H 50/54 335/201 |
| 2014/0062626 | A1 * | 3/2014 | Saito | H01H 51/04 335/185 |
| 2014/0184366 | A1 * | 7/2014 | Ito | H01H 50/54 335/189 |
| 2015/0054603 | A1 * | 2/2015 | Kato | H01F 5/04 335/2 |
| 2015/0318133 | A1 * | 11/2015 | Lauraire | H01H 50/14 335/185 |
| 2018/0261414 | A1 * | 9/2018 | Fujimura | H01H 50/24 |
| 2018/0330906 | A1 * | 11/2018 | Hiramitsu | H05K 7/20236 |
| 2019/0123539 | A1 * | 4/2019 | Tahara | H05K 1/00 |
| 2020/0105488 | A1 * | 4/2020 | Ikushima | H01H 9/443 |
| 2020/0161067 | A1 * | 5/2020 | Harano | H01H 9/383 |
| 2020/0176206 | A1 * | 6/2020 | Kubono | H01H 50/54 |
| 2020/0176207 | A1 * | 6/2020 | Kubono | H01H 50/043 |
| 2020/0350134 | A1 * | 11/2020 | Ishikawa | H01H 50/36 |
| 2020/0373111 | A1 * | 11/2020 | Zhong | H01H 50/541 |
| 2021/0012977 | A1 * | 1/2021 | Nishide | C22C 1/10 |
| 2021/0043404 | A1 * | 2/2021 | Sasaki | H01H 50/58 |
| 2021/0083404 | A1 * | 3/2021 | Harimochi | H01H 50/12 |
| 2021/0090836 | A1 * | 3/2021 | Otsuka | H01H 50/14 |
| 2021/0098216 | A1 * | 4/2021 | Omari | H01H 47/001 |
| 2021/0304992 | A1 * | 9/2021 | Kroeker | H01H 50/02 |
| 2023/0223223 | A1 * | 7/2023 | Itou | H01H 50/546 335/185 |

* cited by examiner

ELECTROMAGNETIC RELAY

CROSS-REFERENCE TO RELATED APPLICATION

This application claims priority to Japanese Patent Application No. 2021-170861, filed Oct. 19, 2021. The contents of that application are incorporated by reference herein in their entirety.

FIELD

The present invention relates to an electromagnetic relay.

BACKGROUND

An electromagnetic relay includes a fixed terminal, a movable contact piece, and a housing. For example, in Japanese Patent Application Publication No. 2021-057225, the fixed terminal protrudes from inside the housing to outside the housing. The movable contact piece is configured to move in a contact direction and an opening direction. The contact direction is a direction in which the movable contact piece contacts the fixed terminal. The opening direction is a direction in which the movable contact piece separates from the fixed terminal. A current flows through the fixed terminal when the movable contact piece contacts the fixed terminal.

SUMMARY

When a large current flows through the electromagnetic relay, the amount of heat generated at the fixed terminal increases. Therefore, it is desired to improve heat dissipation by increasing the surface area of the fixed terminal. However, if the fixed terminal is enlarged in order to increase the surface area of the fixed terminal, the size of the electromagnetic relay is increased. An object of the present invention is to improve the heat dissipation performance of a fixed terminal while suppressing an increase in the size of an electromagnetic relay.

An electromagnetic relay according to one aspect of the present invention includes a housing, a movable contact piece, a first fixed terminal, and a drive device. The movable contact piece is disposed in the housing. The first fixed terminal includes a first contact portion and a first terminal portion. The first contact portion faces the movable contact piece in the housing. The first terminal portion protrudes out of the housing. The first terminal portion has a bent shape. The drive device moves the movable contact piece in a contact direction and an opening direction. The contact direction is a direction in which the movable contact piece contacts the first contact portion. The opening direction is a direction in which the movable contact piece separates from the first contact portion.

In the electromagnetic relay according to the present aspect, the first terminal portion of the first fixed terminal has a bent shape. Therefore, the surface area of the first fixed terminal is increased, and the heat dissipation of the first fixed terminal is improved. Also, the first terminal portion is bent outside the housing. Therefore, an increase in size of the electromagnetic relay is suppressed.

The first fixed terminal may extend vertically from the first contact portion toward the first terminal portion. The first terminal portion may have a shape bent in a direction perpendicular to the vertical direction. In this case, air convection tends to hit the first terminal portion outside the housing. Thereby, the heat dissipation of the first fixed terminal is improved.

The first terminal portion may include a first flat portion and a first bent portion. The first bent portion may be bent with respect to the first flat portion. In this case, the first bent portion increases the surface area of the first fixed terminal. Thereby, the heat dissipation of the first fixed terminal is improved.

The first flat portion and the first bent portion may be integrally formed. In this case, the first flat portion and the first bent portion are easily formed by bending an integrated member. Therefore, manufacturing of the first fixed terminal is easy.

The housing may include a base supporting the first fixed terminal. The base may include a bottom surface and a leg. The leg may protrude from the bottom surface. At least part of the first bent portion may be located between the bottom surface and a lower end of the leg. In this case, when the electromagnetic relay is mounted to a substrate, the leg contacts the substrate to provide a space between the bottom surface of the base and the substrate. At least part of the first bent portion is disposed in the space between the bottom surface of the base and the substrate. Thereby, the heat dissipation of the first fixed terminal is improved.

The lower end of the first bent portion may be located below the lower end of the leg. In this case, the first bent portion is connected to the substrate. Thereby, the heat dissipation of the first fixed terminal is improved.

The electromagnetic relay may further include a second fixed terminal. The second fixed terminal may include a second contact portion and a second terminal portion. The second contact portion may face the movable contact piece in the housing. The second terminal portion may protrude outside the housing. The second terminal portion may have a bent shape.

In this case, the second terminal portion of the second fixed terminal has a bent shape. Therefore, the surface area of the second fixed terminal is increased, and the heat dissipation of the second fixed terminal is improved. Also, the second terminal portion is bent outside the housing. Therefore, an increase in size of the electromagnetic relay is suppressed.

The second terminal portion may include a second flat portion and a second bent portion. The second bent portion may be bent with respect to the second flat portion. In this case, the second bent portion increases the surface area of the second fixed terminal. Thereby, the heat dissipation of the second fixed terminal is improved.

The first bent portion and the second bent portion may have shapes bent in the same direction with respect to the first flat portion and the second flat portion. In this case, the first terminal portion and the second terminal portion are disposed compactly.

The first bent portion and the second bent portion may have shapes bent in directions opposite to each other with respect to the first flat portion and the second flat portion. In this case, air convection tends to hit each of the first terminal portion and the second terminal portion. Thereby, the heat dissipation of the first fixed terminal and the second fixed terminal is improved.

The first terminal portion may further include a third bent portion. The third bent portion may be bent with respect to the first flat portion in the same direction as the first bent portion. In this case, the third bent portion further increases the surface area of the first fixed terminal. Thereby, the heat dissipation of the first fixed terminal is improved. Also, the first bent portion and the third bent portion are disposed compactly.

The third bent portion may bend with respect to the first flat portion in a direction opposite to the first bent portion. In this case, air convection tends to hit each of the first bent portion and the third bent portion respectively. Thereby, the heat dissipation of the first fixed terminal is improved.

DETAILED DESCRIPTION

Figure 1:
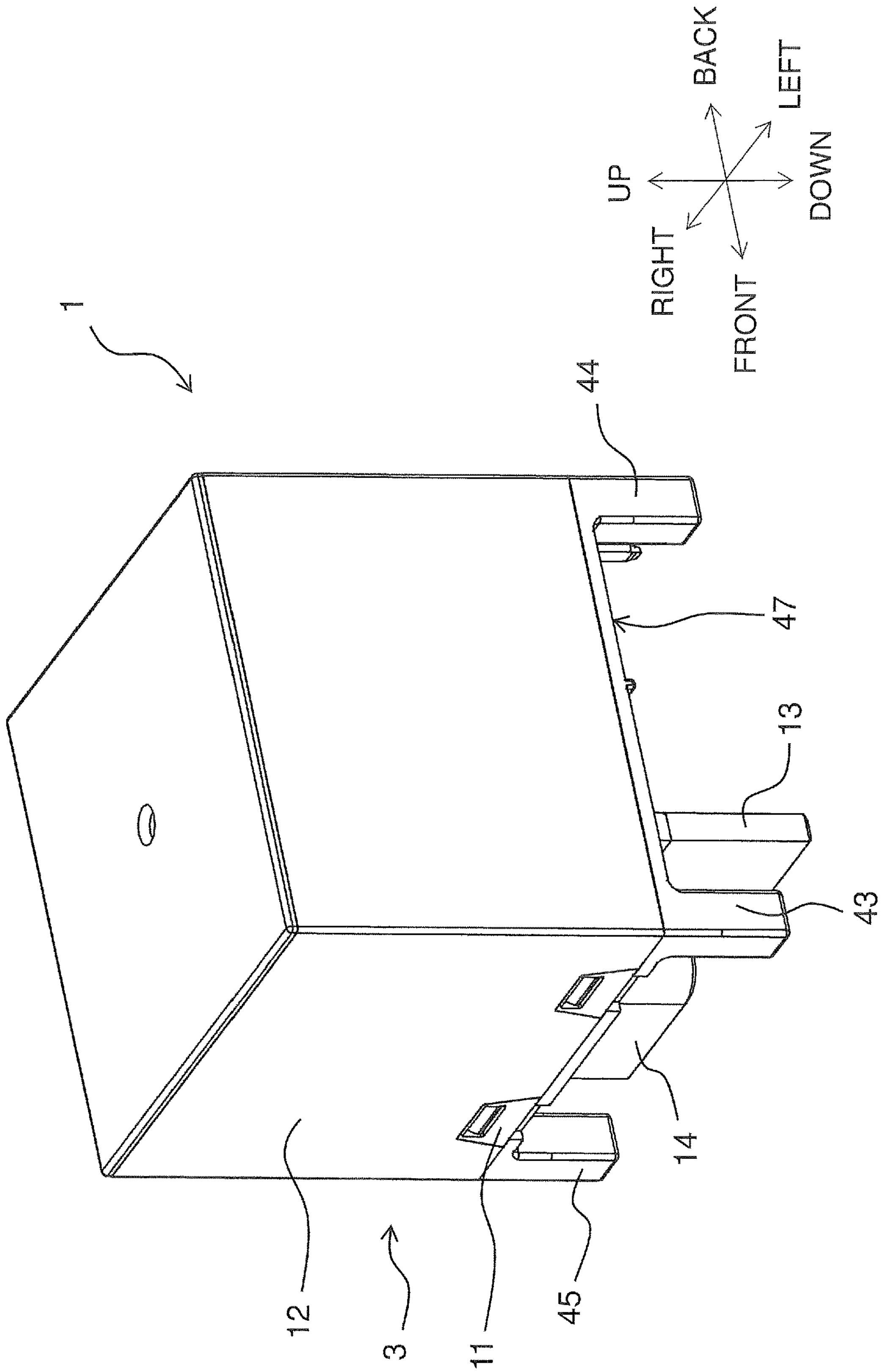
FIG. 1 is an external perspective view of an electromagnetic relay according to an embodiment.
Figure 2:
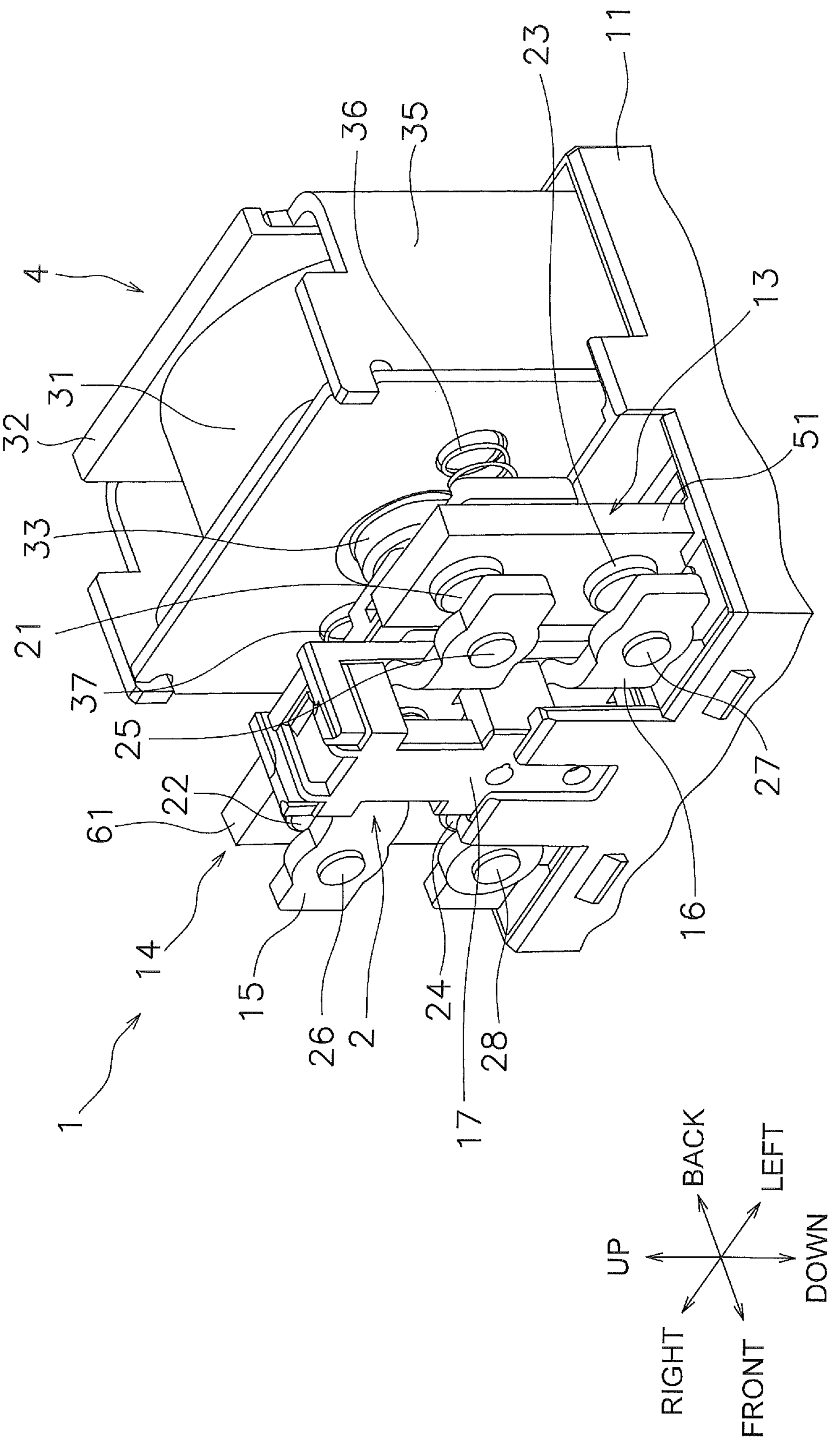
FIG. 2 is a perspective view of the inside of the electromagnetic relay.
Figure 3:
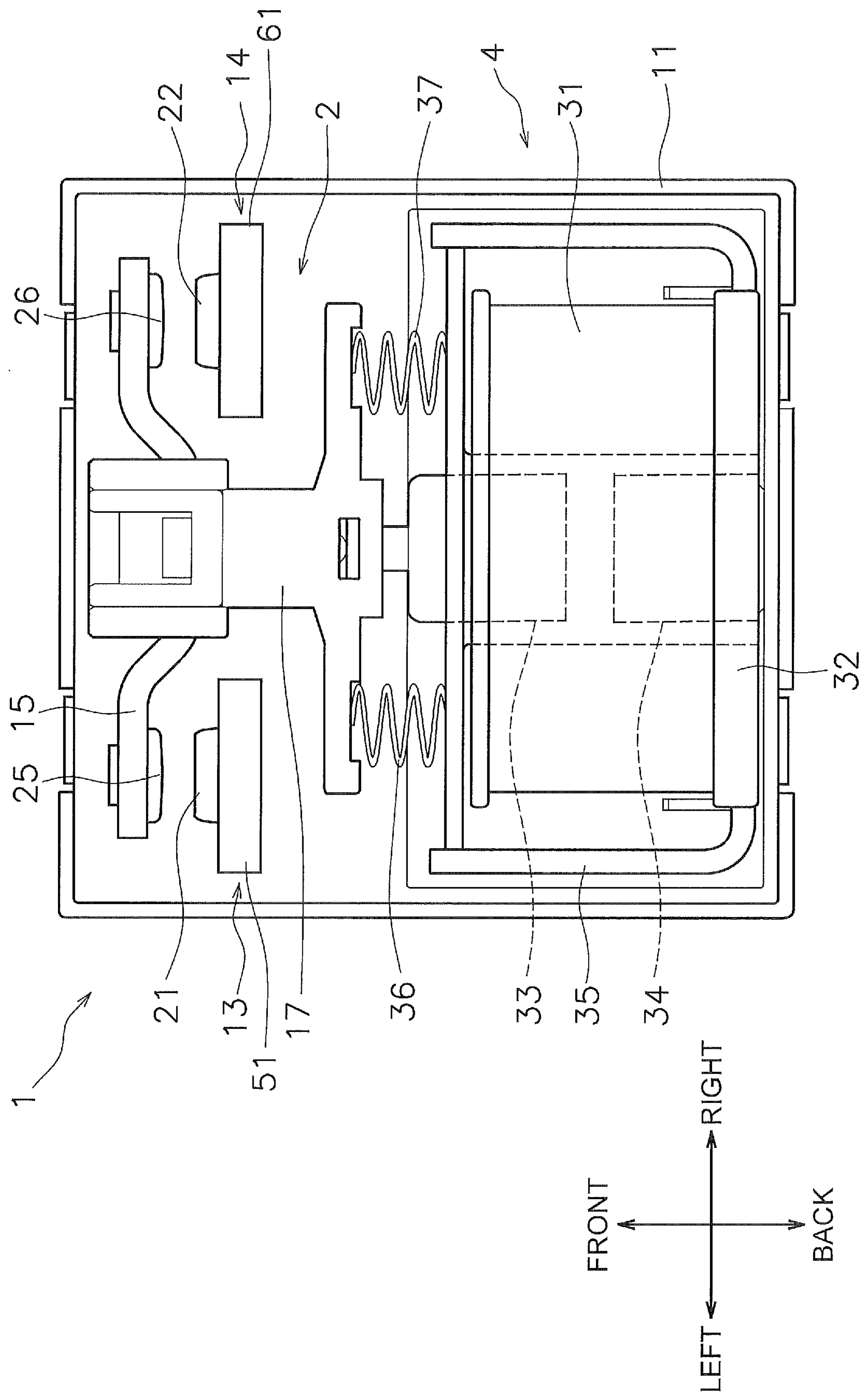
FIG. 3 is a top view of the electromagnetic relay when a moving member is in an open position.
Figure 4:
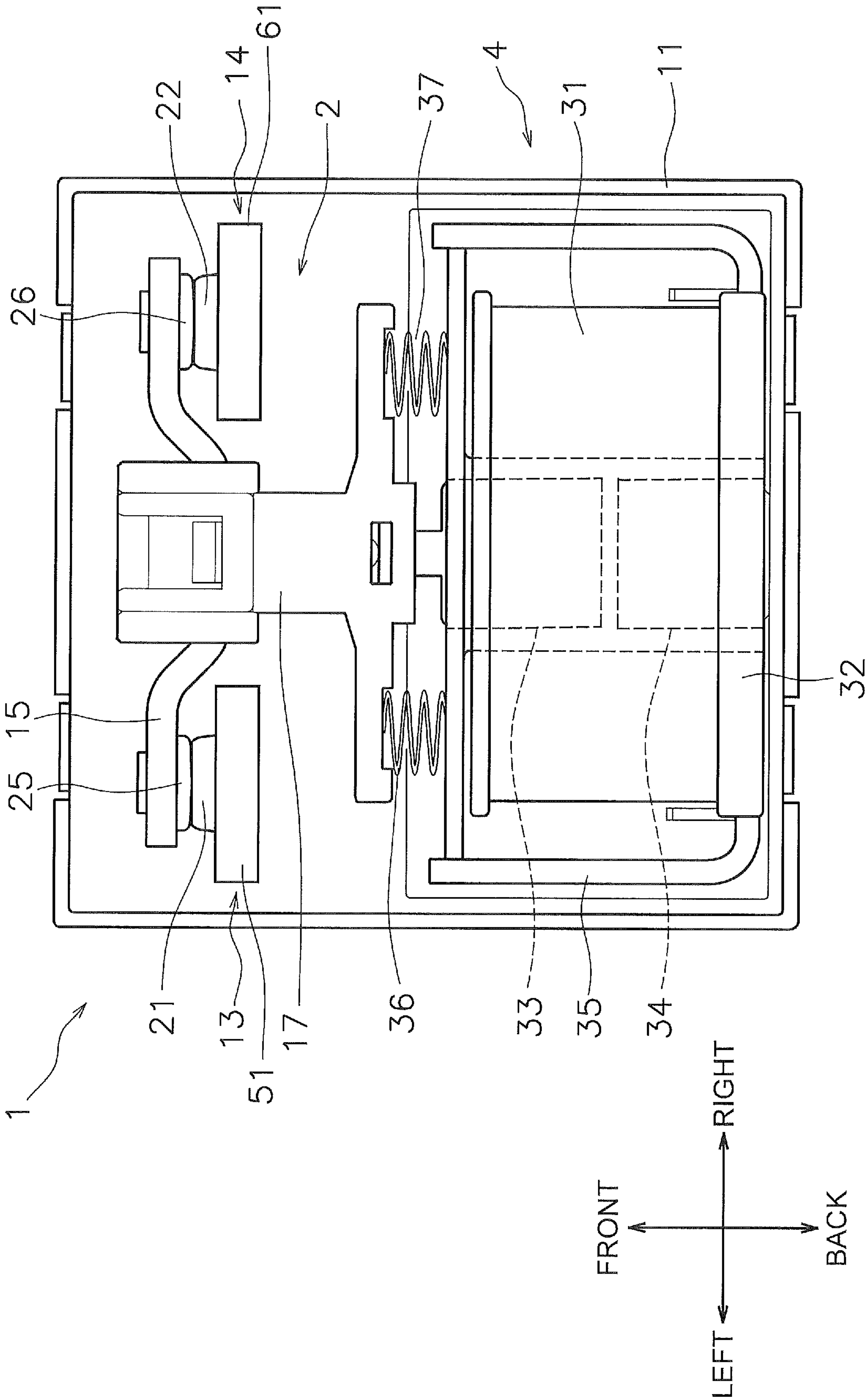
FIG. 4 is a top view of the electromagnetic relay when the moving member is in a closed position.

An electromagnetic relay 1 according to an embodiment will be described below with reference to the drawings. FIG. 1 is an external perspective view of the electromagnetic relay 1 according to the embodiment. FIG. 2 is a perspective view of the inside of the electromagnetic relay 1. FIGS. 3 and 4 are top views of the inside of the electromagnetic relay 1.

The electromagnetic relay 1 includes a contact device 2, a housing 3, and a drive device 4. The contact device 2 and the drive device 4 are disposed in housing 3. The housing 3 includes a base 11 and a case 12. The case 12 is omitted in FIGS. 2 to 4. The base 11 supports the contact device 2 and the drive device 4.

In the following description, a direction from the base 11 toward the contact device 2 and the drive device 4 is defined as upward, and the opposite direction is defined as downward. A direction from the drive device 4 towards the contact device 2 is defined as forward and the opposite direction as rearward. A direction perpendicular to the up-down direction and the front-back direction is defined as the left-right direction.

The contact device 2 includes a first fixed terminal 13, a second fixed terminal 14, a first movable contact piece 15, a second movable contact piece 16, and a moving member 17. The first fixed terminal 13 and the second fixed terminal 14 are made of a conductive material such as copper. The first fixed terminal 13 and the second fixed terminal 14 each extend vertically.

The first fixed terminal 13 and the second fixed terminal 14 are disposed apart from each other in the left-right direction. The first fixed terminal 13 and the second fixed terminal 14 each extend vertically. The first fixed terminal 13 and the second fixed terminal 14 are fixed to the base 11. The first fixed terminal 13 and the second fixed terminal 14 protrude from inside the housing 3 to outside of the housing 3. The first fixed terminal 13 and the second fixed terminal 14 protrude downward from the base 11.

A first fixed contact 21 and a third fixed contact 23 are connected to the first fixed terminal 13. A second fixed contact 22 and a fourth fixed contact 24 are connected to the second fixed terminal 14. The first to fourth fixed contacts 21 to 24 are made of a conductive material such as silver or copper.

The first movable contact piece 15 and the second movable contact piece 16 extend in the left-right direction. The first movable contact piece 15 and the second movable contact piece 16 are provided separately from each other. The first movable contact piece 15 and the second movable contact piece 16 are made of a conductive material such as copper.

The first movable contact piece 15 is disposed to face the first fixed terminal 13 and the second fixed terminal 14. A first movable contact 25 and a second movable contact 26 are connected to the first movable contact piece 15. The first movable contact 25 is disposed to face the first fixed contact 21. The second movable contact 26 is disposed to face the second fixed contact 22.

The second movable contact piece 16 is disposed to face the first fixed terminal 13 and the second fixed terminal 14. A third movable contact 27 and a fourth movable contact 28 are connected to the second movable contact piece 16. The third movable contact 27 is disposed to face the third fixed contact 23. The fourth movable contact 28 is disposed to face the fourth fixed contact 24. The first to fourth movable contacts 25 to 28 are made of a conductive material such as silver or copper.

The moving member 17 holds the first movable contact piece 15 and the second movable contact piece 16. The moving member 17 is made of an electrically insulating resin. The moving member 17 is movable in the front-rear direction. The moving member 17 is movable between a closed position and an open position. In FIG. 3, the moving member 17 is in the open position. When the moving member 17 is in the open position, the movable contacts 25 to 28 are separated from the fixed contacts 21 to 24, respectively. In FIG. 4, the moving member 17 is in the closed position. When the moving member 17 is in the closed position, the movable contacts 25 to 28 contact the fixed contacts 21 to 24, respectively.

The drive device 4 moves the first movable contact piece 15 and the second movable contact piece 16 by electromagnetic force. The drive device 4 moves the first movable contact piece 15 and the second movable contact piece 16 in a contact direction and an opening direction. The contact direction is a direction in which the movable contacts 25 to 28 contact the fixed contacts 21 to 24. The opening direction is a direction in which the movable contacts 25 to 28 separate from the fixed contacts 21 to 24. In the present embodiment, the contact direction is rearward and the opening direction is forward.

The drive device 4 includes a coil 31, a spool 32, a movable iron core 33, a fixed iron core 34, and a yoke 35.

The coil 31 is wound around the spool 32. At least part of the movable iron core 33 is disposed in the spool 32. The movable iron core 33 is configured to move in the front-rear direction. The fixed iron core 34 is disposed in the spool 32. The fixed iron core 34 is disposed to face the movable iron core 33. The coil 31 generates an electromagnetic force that moves the movable iron core 33 when energized.

The movable iron core 33 is connected to the moving member 17. The movable iron core 33 moves in the contact direction according to the magnetic force generated from the coil 31. As the movable iron core 33 moves, the moving member 17 moves to the closed position. The yoke 35 is disposed to surround the coil 31. The yoke 35 is disposed on the magnetic circuit formed by the coil 31.

The electromagnetic relay 1 includes a first return spring 36 and a second return spring 37. The first return spring 36 and the second return spring 37 are disposed between the moving member 17 and the drive device 4. The first return spring 36 and the second return spring 37 bias the moving member 17 in the opening direction.

Next, operation of the electromagnetic relay 1 will be described. When the coil 31 is not energized, the drive device 4 is not excited. In this case, the moving member 17 is pushed in the opening direction together with the movable iron core 33 by the elastic forces of the return springs 36 and 37, and the moving member 17 is located at the open position shown in FIG. 3.

In this state, the first movable contact piece 15 and the second movable contact piece 16 are also pressed in the opening direction via the moving member 17. Therefore, when the moving member 17 is at the open position, the first movable contact 25 and the second movable contact 26 are separated from the first fixed contact 21 and the second fixed contact 22. Similarly, when the moving member 17 is at the open position, the third movable contact 27 and the fourth movable contact 28 are separated from the third fixed contact 23 and the fourth fixed contact 24.

When the coil 31 is energized, the drive device 4 is excited. In this case, the electromagnetic force of the coil 31 causes the movable iron core 33 to move in the contact direction against the elastic forces of the return springs 36 and 37. Thereby, the moving member 17, the first movable contact piece 15, and the second movable contact piece 16 move together in the contact direction. Accordingly, the moving member 17 moves to the closed position, as shown in FIG. 4.

As a result, when the moving member 17 is at the closed position, the first movable contact 25 and the second movable contact 26 contact the first fixed contact 21 and the second fixed contact 22, respectively. Similarly, when the moving member 17 is in the closed position, the third movable contact 27 and the fourth movable contact 28 contact the third fixed contact 23 and the fourth fixed contact 24, respectively. Thereby, the first movable contact piece 15 and the second movable contact piece 16 are electrically connected to the first fixed terminal 13 and the second fixed terminal 14.

When the current to the coil 31 is stopped and demagnetized, the movable iron core 33 is pushed in the opening direction by the elastic forces of the return springs 36 and 37. As a result, the moving member 17, the first movable contact piece 15, and the second movable contact piece 16 move together in the opening direction. Accordingly, the moving member 17 moves to the open position, as shown in FIG. 3.

As a result, when the moving member 17 is at the open position, the first movable contact 25 and the second movable contact 26 are separated from the first fixed contact 21 and the second fixed contact 22. Similarly, when the moving member 17 is at the open position, the third movable contact 27 and the fourth movable contact 28 are separated from the third fixed contact 23 and the fourth fixed contact 24.

Figure 5:
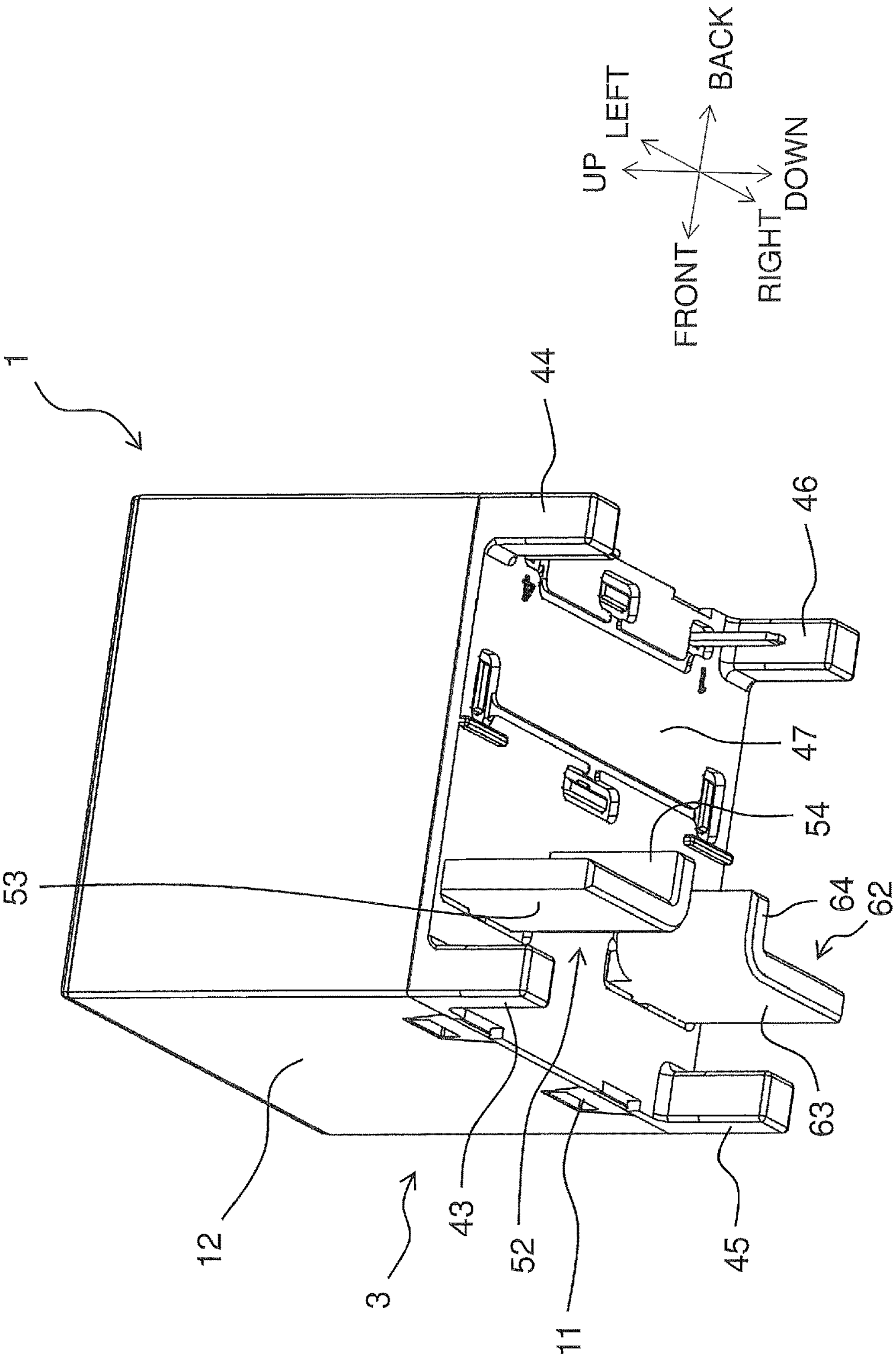
FIG. 5 is a perspective view of the electromagnetic relay viewed from below.

When a large current flows in the electromagnetic relay 1, the first and second fixed terminals 13 and 14 and the first and second movable contact pieces 15 and 16 become hot. In the electromagnetic relay 1 according to the present embodiment, the first fixed terminal 13 and the second fixed terminal 14 have a bent shape as shown in FIG. 5 in order to improve heat dissipation of the electromagnetic relay 1. The structures of the first fixed terminal 13 and the second fixed terminal 14 will be described in detail below.

Figure 6:
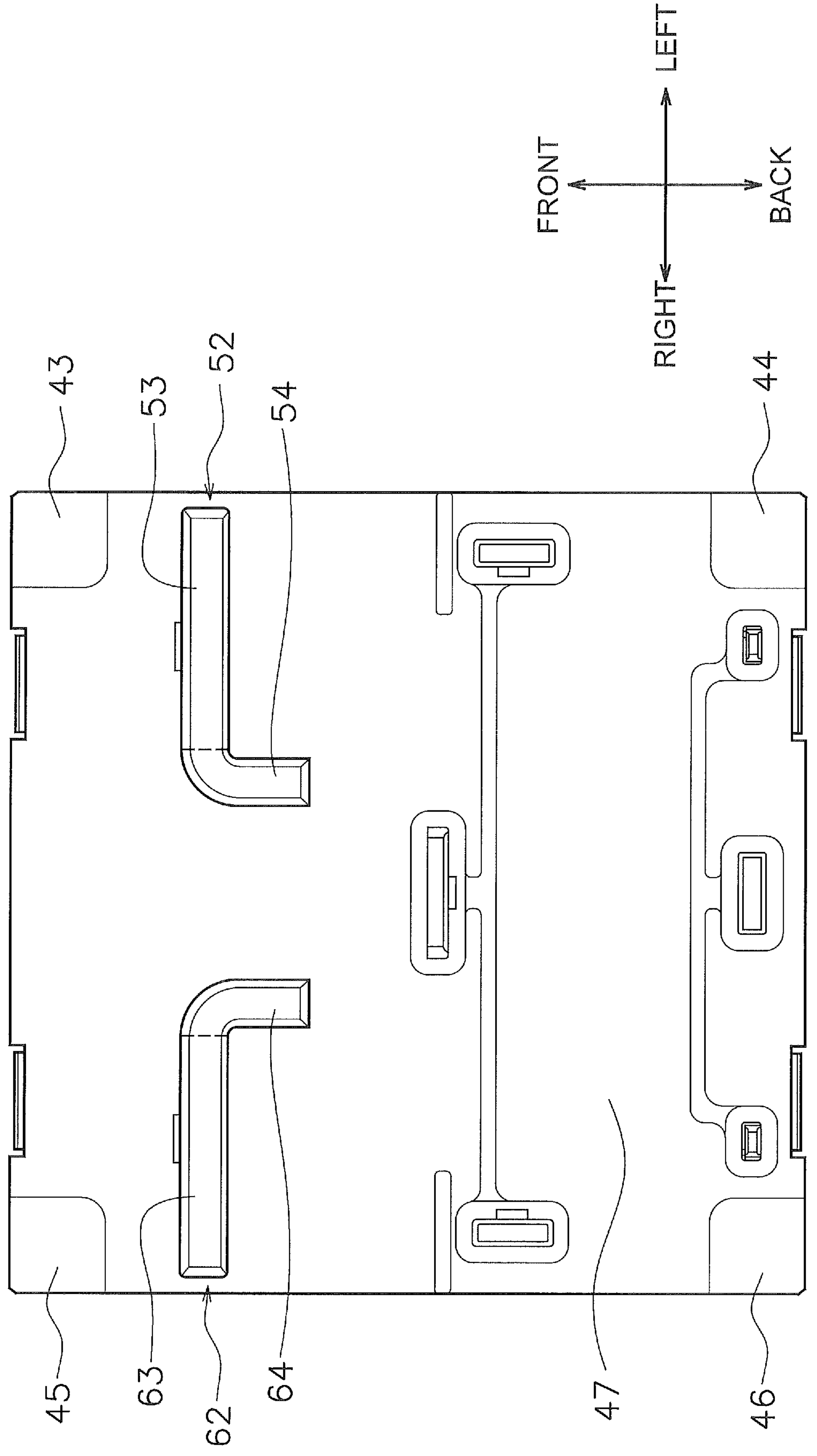
FIG. 6 is a bottom view of the electromagnetic relay.
Figure 7:
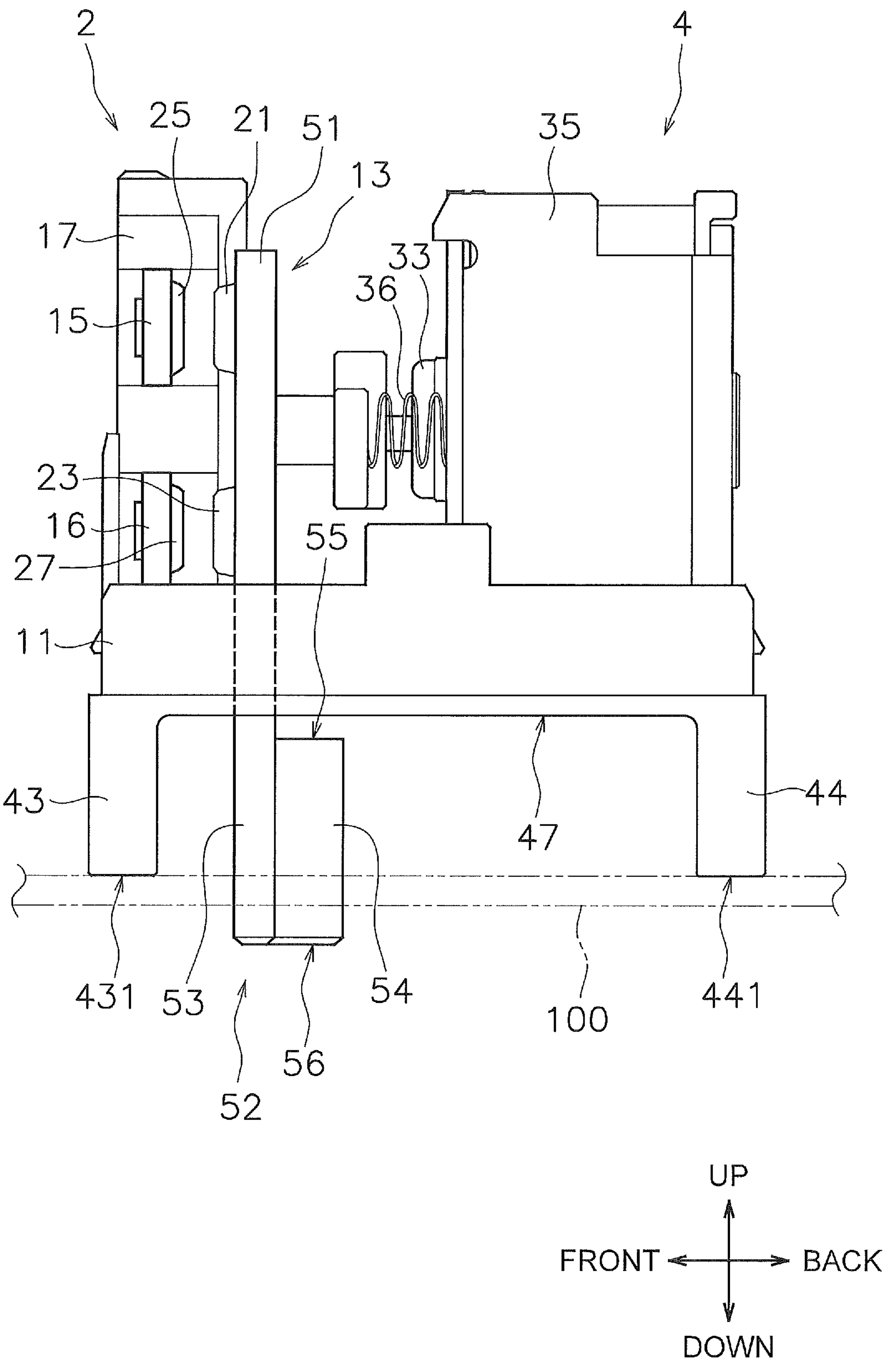
FIG. 7 is a side view of the inside of the electromagnetic relay.
Figure 8:
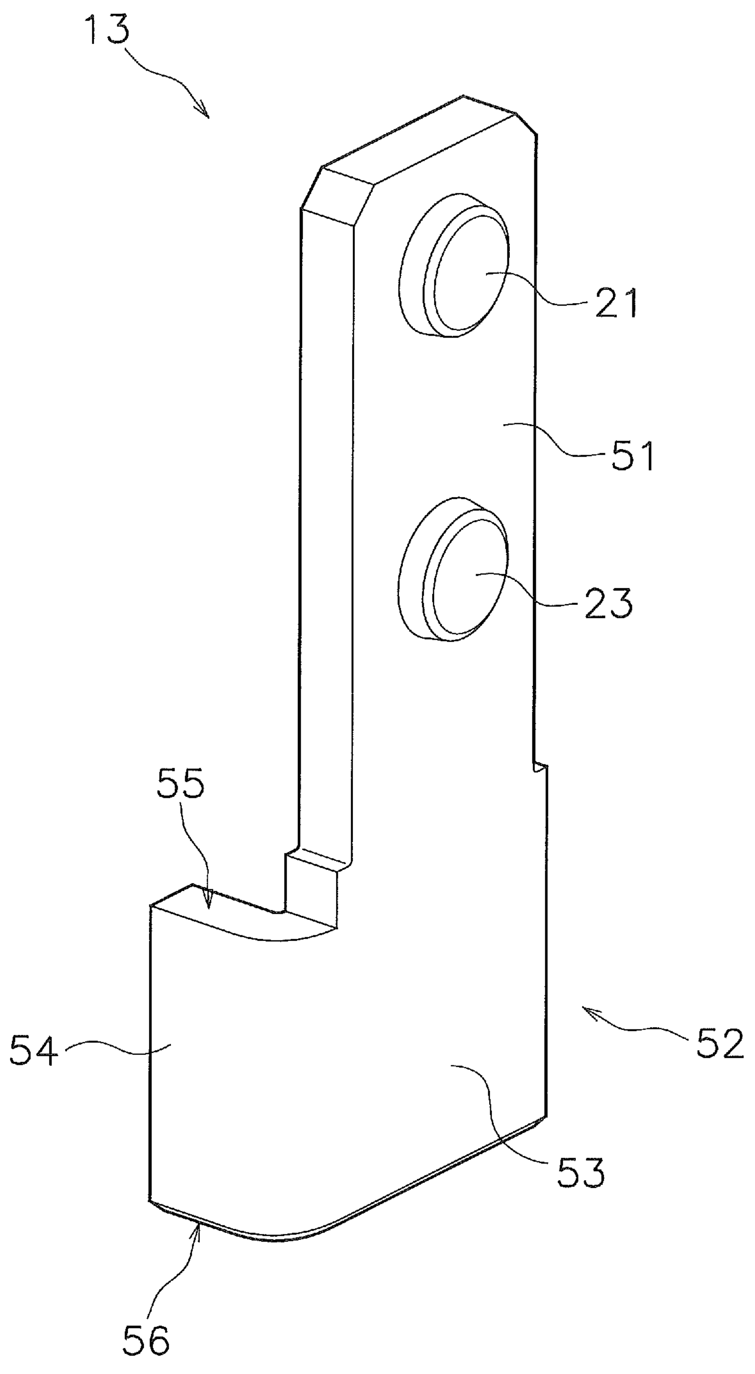
FIG. 8 is a perspective view of a first fixed terminal.

FIG. 6 is a bottom view of the electromagnetic relay 1. FIG. 7 is a side view of the inside of the electromagnetic relay 1. FIG. 8 is a perspective view of the first fixed terminal 13. As shown in FIGS. 5 to 8, the first fixed terminal 13 includes a first contact portion 51 and a first terminal portion 52. The first contact portion 51 is disposed in the housing 3. The first contact portion 51 extends upward from the base 11. The first contact portion 51 faces the movable contact pieces 15 and 16. The first fixed contact 21 and the third fixed contact 23 are attached to the first contact portion 51.

The first terminal portion 52 is disposed outside the housing 3. The first terminal portion 52 protrudes from the bottom surface 47 of the base 11. The first terminal portion 52 extends downward from the bottom surface 47 of the base 11. The first terminal portion 52 has a shape bent in the horizontal direction. The first terminal portion 52 has an L-shaped bent shape.

Specifically, the first terminal portion 52 includes a first flat portion 53 and a first bent portion 54. The first contact portion 51, the first flat portion 53, and the first bent portion 54 are integrally formed. For example, the first contact portion 51, the first flat portion 53, and the first bent portion 54 are formed by bending a single metal plate. The first flat portion 53 is connected to the first contact portion 51. The first flat portion 53 extends downward from the first contact portion 51.

The first bent portion 54 is connected to the first flat portion 53. The first bent portion 54 is disposed inside the first flat portion 53 in the left-right direction. The first bent portion 54 is bent with respect to the first flat portion 53. The first bent portion 54 is bent rearward. The first bent portion 54 extends rearward from the first flat portion 53.

As shown in FIGS. 1 and 5, the base 11 includes a plurality of legs 43 to 46. The plurality of legs 43 to 46 protrude downward from the bottom surface 47 of the base 11. As shown in FIG. 7, the plurality of legs 43 to 46 contact a substrate 100 to which the electromagnetic relay 1 is mounted.

As shown in FIG. 7, part of the first bent portion 54 is located between the bottom surface 47 and lower ends 431 and 441 of the legs 43 and 44. An upper end 55 of the first bent portion 54 is located below the bottom surface 47. A lower end 56 of the first bent portion 54 is located below the lower ends 431 and 441 of the legs 43 and 44. The first terminal portion 52 is connected to the substrate 100. The first flat portion 53 and the first bent portion 54 are connected to the substrate 100.

The second fixed terminal 14 has a bent shape like the first fixed terminal 13. The second fixed terminal 14 includes a second contact portion 61 and a second terminal portion 62. The second contact portion 61 is disposed in the housing 3. The second contact portion 61 extends upward from the base 11. The second contact portion 61 faces the movable contact pieces 15 and 16. The second fixed contact 22 and the fourth fixed contact 24 are attached to the second contact portion 61.

The second terminal portion 62 is disposed outside the housing 3. The second terminal portion 62 protrudes from the bottom surface 47 of the base 11. The second terminal portion 62 extends downward from the bottom surface 47 of the base 11. As shown in FIG. 6, the second terminal portion 62 has a shape bent in the same direction as the first terminal portion 52. The second terminal portion 62 has an L-shaped bent shape. The second terminal portion 62 has a shape symmetrical to the first terminal portion 52.

Specifically, the second terminal portion 62 includes a second flat portion 63 and a second bent portion 64. The second contact portion 61, the second flat portion 63, and the second bent portion 64 are integrally formed. The second flat portion 63 is connected to the second contact portion 61. The second flat portion 63 extends downward from the second contact portion 61.

The second bent portion 64 is connected to the second flat portion 63. The second bent portion 64 is disposed inside the second flat portion 63 in the left-right direction. The second bent portion 64 faces the first bent portion 54 in the left-right direction. The second bent portion 64 is bent with respect to the second flat portion 63. The second bent portion 64 is bent in the same direction as the first bent portion 54. The second bent portion 64 is bent rearward.

The second bent portion 64 extends rearward from the second flat portion 63. The second bent portion 64 is disposed below the bottom surface 47 of the base 11 in the same manner as the first bent portion 54. The second flat portion 63 and the second bent portion 64 are connected to the substrate 100 in the same manner as the first flat portion 53 and the first bent portion 54.

In the electromagnetic relay 1 according to the present embodiment described above, the first terminal portion 52 of the first fixed terminal 13 has a bent shape. Therefore, the surface area of the first fixed terminal 13 is increased, and the heat dissipation of the first fixed terminal 13 is improved. The second terminal portion 62 of the second fixed terminal 14 has a bent shape. Therefore, the surface area of the second fixed terminal 14 is increased, and the heat dissipation of the second fixed terminal 14 is improved. Also, the first terminal portion 52 and the second terminal portion 62 are bent outside the housing 3. Therefore, an increase in size of the electromagnetic relay 1 is suppressed.

Although one embodiment of the present invention has been described above, the present invention is not limited to the above-described embodiment, and various modifications are possible without departing from the gist of the invention.

The structures of the contact device 2 and the drive device 4 are not limited to those of the above embodiment, and may be modified. For example, in the above-described embodiment, the electromagnetic relay 1 is of a so-called plunger type. However, in another type of electromagnetic relay such as a hinge type, a fixed terminal having a structure similar to that of the first fixed terminal 13 described above may be provided.

The shape or arrangement of the first fixed terminal 13, the second fixed terminal 14, the first movable contact piece 15, and the second movable contact piece 16 may be changed. For example, the first movable contact piece 15 and the second movable contact piece 16 may be integrated. That is, the first to fourth movable contacts 25 to 28 may be connected to the integral movable contact piece. Alternatively, the second movable contact piece 16, the third and fourth movable contacts 27 and 28, and the third and fourth fixed contacts 23 and 24 may be omitted.

The first fixed contact 21 and the third fixed contact 23 may be integrated with the first fixed terminal 13. The first fixed contact 21 and the third fixed contact 23 may be omitted. The second fixed contact 22 and the fourth fixed contact 24 may be integrated with the second fixed terminal 14. The second fixed contact 22 and the fourth fixed contact 24 may be omitted.

The first movable contact 25 and the second movable contact 26 may be integrated with the first movable contact piece 15. The first movable contact 25 and the second movable contact 26 may be omitted. The third movable contact 27 and the fourth movable contact 28 may be integrated with the second movable contact piece 16. The third movable contact 27 and the fourth movable contact 28 may be omitted.

The shapes of the first terminal portion 52 and the second terminal portion 62 are not limited to those of the above embodiment, and may be changed. For example, the first flat portion 53 and the first bent portion 54 may be provided separately from each other. The second flat portion 63 and the second bent portion 64 may be provided separately from each other.

Figure 9A:
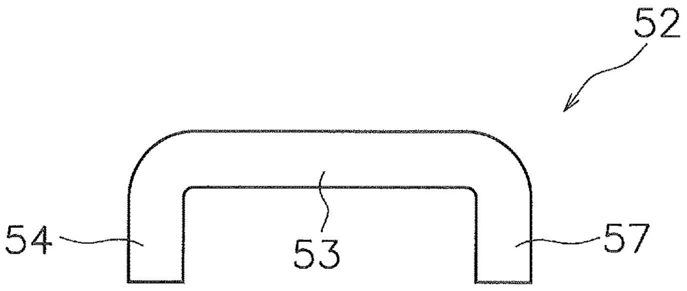
FIG. 9A is a bottom view of a first terminal portion according to a first modification.

FIG. 9A is a bottom view of the first terminal portion 52 according to a first modification. As shown in FIG. 9A, the first terminal portion 52 may have a U-shaped bent shape. Specifically, the first terminal portion 52 further includes a third bent portion 57. The third bent portion 57 is bent in the same direction as the first bent portion 54.

Figure 9B:
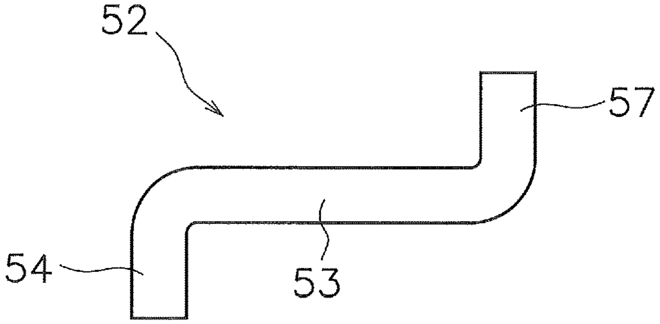
FIG. 9B is a bottom view of the first terminal portion according to a second modification.

FIG. 9B is a bottom view of the first terminal portion 52 according to a second modification. As shown in FIG. 9B, the third bent portion 57 may bend in the opposite direction to the first bent portion 54.

Figure 9C:
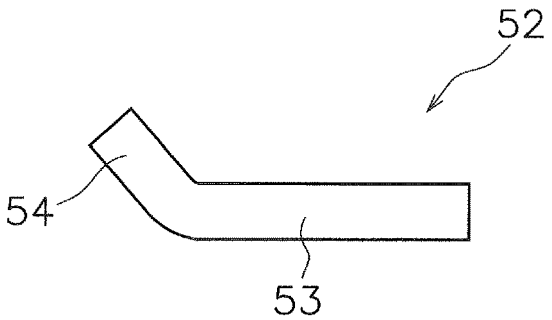
FIG. 9C is a bottom view of the first terminal portion according to a third modification.

FIG. 9C is a bottom view of the first terminal portion 52 according to a third modification. In the above embodiment, the first bent portion 54 is bent at 90 degrees with respect to the first flat portion 53. However, as shown in FIG. 9C, the bending angle of the first bent portion 54 may be other than 90 degrees. For example, the bending angle of the first bent portion 54 may be an obtuse angle. The second terminal portion 62 may also have the same shape as the first terminal portion 52 according to the first to third modifications.

Figure 10A:
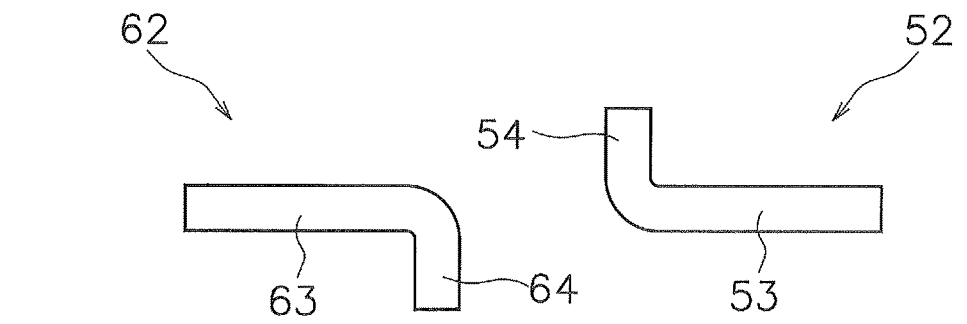
FIG. 10A is a bottom view of the first terminal portion and a second terminal portion according to a fourth modification.

In the above embodiment, the first terminal portion 52 and the second terminal portion 62 have symmetrical shapes. However, the first terminal portion 52 and the second terminal portion 62 may have shapes that are asymmetrical to each other. For example, FIG. 10A is a bottom view of the first terminal portion 52 and the second terminal portion 62 according to a fourth modification. As shown in FIG. 10A, the first bent portion 54 and the second bent portion 64 may bend in opposite directions.

Figure 10B:
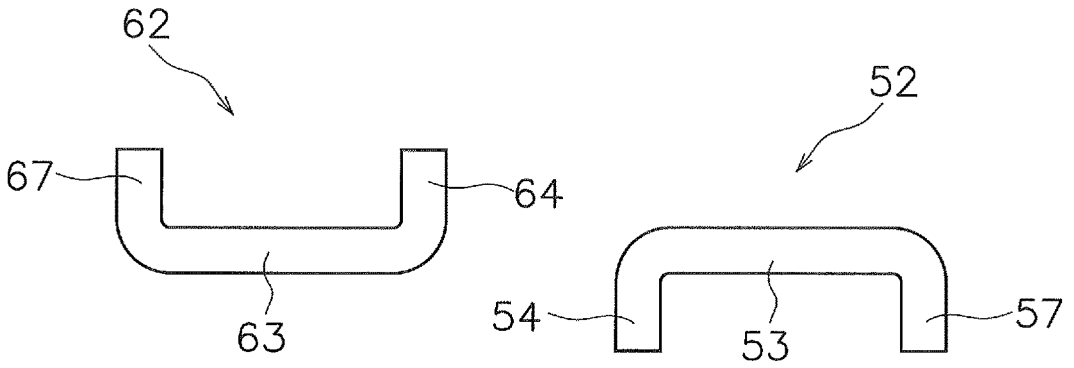
FIG. 10B is a bottom view of the first terminal portion and the second terminal portion according to a fifth modification.

FIG. 10B is a bottom view of the first terminal portion 52 and the second terminal portion 62 according to a fifth modification. As shown in FIG. 10B, the second terminal portion 62 may further include a fourth bent portion 67. The second bent portion 64 and the fourth bent portion 67 may be bent in the direction opposite to the first bent portion 54 and the third bent portion 57.

Figure 10C:
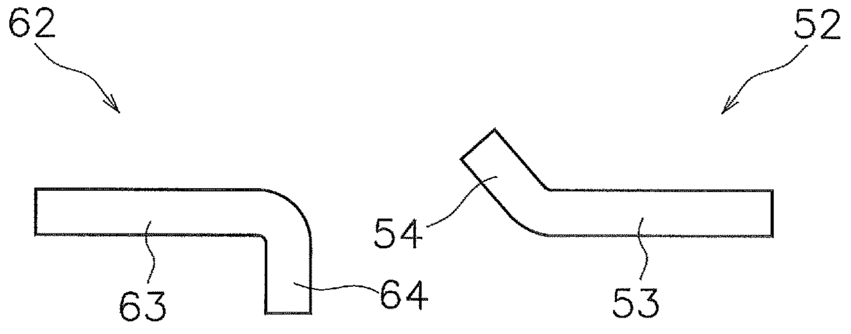
FIG. 10C is a bottom view of the first terminal portion and the second terminal portion according to a sixth modification.

FIG. 10C is a bottom view of the first terminal portion 52 and the second terminal portion 62 according to a sixth modification. As shown in FIG. 10C, the shapes of the first terminal portion 52 and the second terminal portion 62 may be different from each other. For example, the bending angle of the first bent portion 54 and the bending angle of the second bent portion 64 may be different from each other.

REFERENCE SIGNS LIST

3: Housing, 4: Drive device, 11: Base, 13: First fixed terminal, 14: Second fixed terminal, 15: First movable contact piece, 43: Leg, 51: First contact portion, 52: First terminal portion, 53: First flat portion, 54: First bent portion, 57: Third bent portion, 61: Second contact portion, 62: Second terminal portion, 63: Second flat portion, 64: Second bent portion

The invention claimed is:

1. An electromagnetic relay, comprising:
- a housing;
- a movable contact piece disposed in the housing;
- a first fixed terminal extending from inside the housing to outside of the housing and including
  - a first contact portion located inside the housing and facing the movable contact piece, and
  - a first terminal portion, the first terminal portion being the portion of the first fixed terminal that lies outside of the housing and the first terminal portion having a bent shape outside of the housing;
- a drive device configured to move the movable contact piece in a contact direction and an opening direction, the contact direction being a direction in which the movable contact piece contacts the first contact portion, the opening direction being a direction in which the movable contact piece separates from the first contact portion; and
- a second fixed terminal extending from inside the housing to outside of the housing in the same direction as the first fixed terminal extends from inside the housing to outside of the housing, the second fixed terminal including
  - a second contact portion located inside the housing and facing the movable contact piece, and
  - a second terminal portion, the second terminal portion being the portion of the second fixed terminal that lies outside the housing and the second terminal portion having a bent shape outside of the housing.

2. The electromagnetic relay according to claim 1, wherein
- the first fixed terminal extends in a vertical direction from the first contact portion toward the first terminal portion, and
- the first terminal portion has a shape bent in a direction perpendicular to the vertical direction.

3. The electromagnetic relay according to claim 1, wherein
- the first terminal portion includes
  - a first flat portion, and
  - a first bent portion bent with respect to the first flat portion.

4. The electromagnetic relay according to claim 3, wherein
- the first flat portion and the first bent portion are integrally formed.

5. The electromagnetic relay according to claim 3, wherein
- the housing includes a base that supports the first fixed terminal,
- the base includes
  - a bottom surface, and
  - a leg protruding from the bottom surface, and
- at least part of the first bent portion is located between the bottom surface and a lower end of the leg.

6. The electromagnetic relay according to claim 5, wherein
- a lower end of the first bent portion is located below the lower end of the leg.

7. The electromagnetic relay according to claim 3, wherein
- the first terminal portion further includes an additional bent portion bent with respect to the first flat portion in the same direction as the first bent portion.

8. The electromagnetic relay according to claim 3, wherein
- the first terminal portion further includes an additional bent portion bent with respect to the first flat portion in a direction opposite to the first bent portion.

9. The electromagnetic relay according to claim 1, wherein
- the second terminal portion includes
  - a second flat portion, and
  - a second bent portion bent with respect to the second flat portion.

10. The electromagnetic relay according to claim 9, wherein
- the first bent portion and the second bent portion have shapes bent in the same direction with respect to the first flat portion and the second flat portion.

11. The electromagnetic relay according to claim 9, wherein
- the first bent portion and the second bent portion have shapes bent in directions opposite to each other with respect to the first flat portion and the second flat portion.

* * * * *